United States Patent [19]

Choi

[11] Patent Number: 5,566,156

[45] Date of Patent: Oct. 15, 1996

[54] DISC PLAYER WITH LOADING AND UNLOADING DEVICES MOVING WITHIN VERTICAL ELONGATED GROOVES

[75] Inventor: Youngsuk Choi, Seoul, Rep. of Korea

[73] Assignee: Daewoo Electronics Co., Ltd., Seoul, Rep. of Korea

[21] Appl. No.: 362,308

[22] Filed: Dec. 22, 1994

[30] Foreign Application Priority Data

Dec. 24, 1993 [KR] Rep. of Korea ............... 93-29439
Dec. 28, 1993 [KR] Rep. of Korea ............... 93-30152

[51] Int. Cl.⁶ ................................................. G11B 17/04
[52] U.S. Cl. ................................. 369/77.2; 360/99.06
[58] Field of Search .............................. 369/77.2, 77.1, 369/75.2; 360/99.06, 99.07, 96.5, 96.6

[56] References Cited

U.S. PATENT DOCUMENTS

| | | | |
|---|---|---|---|
| 4,627,037 | 12/1986 | Tamaru et al. | 369/77.2 |
| 4,727,444 | 2/1988 | Fukushima et al. | 369/75.2 |
| 5,067,121 | 11/1991 | Einhaus | 369/77.2 |
| 5,166,918 | 11/1992 | Kamijo | 360/99.06 |

*Primary Examiner*—Stuart S. Levy
*Assistant Examiner*—Kevin M. Watkins
*Attorney, Agent, or Firm*—Lowe, Price, LeBlanc & Becker

[57] ABSTRACT

A deck having a spindle assembly is disposed above a base plate of a disc player. There is placed a tray for carrying a disc above the deck. A cartridge loading member is connected to sides of the deck and the tray. The loading member has one operating piece and two springs. One end of each of the springs is connected to the operating piece. Other end of each of these springs is elastically connected to the deck. A top of the operating piece is hinged on a side of the tray. Either on lower position of the operating piece or on position of side wall of deck corresponding to the operating piece is formed a guide projection. On the other position is formed a guide groove vertically elongated. This projection can be slidably connected within this guide groove. When a user inserts the disc cartridge thereinto, the second spring is pulled in the insertion direction to erect operating piece. Thus, the strained first spring is pulled downward and the operating piece of the loading member is elastically moved downward along the guide groove to mount the tray with the disc on the deck. The disc player can be provided with the loading and the ejecting units operated with a simple machinery mechanism, so that an internal construction has become simpler to achieve miniaturization of the disc player.

11 Claims, 10 Drawing Sheets

DISC PLAYER WITH LOADING AND UNLOADING DEVICES MOVING WITHIN VERTICAL ELONGATED GROOVES

BACKGROUND OF THE INVENTION

1. Field of the Invention

The present invention relates to a disc player with loading and ejecting devices and more particularly, to a disc player provided with loading and ejecting devices by means of a simple machinery mechanism.

2. Description of the Prior Arts

In general, disc players can record information on and/or reproduce information from discs of magnetic or optical type such as an optical video disc, a digital audio disc or a compact disc etc. There are several methods for loading the discs into the player and unloading them therefrom. The disc player of the front loading type wherein a tray having the disc mounted thereon is moved in the horizontal direction and then downward in the vertical direction thereby causing the disc to be mounted above a turntable is disclosed in U.S. Pat. No. 5,025,339 (issued to Kanno et al.). A disc loading device used in that of a front loading type is frequently employed. Recently, the disc player continues to be developed, especially the disc player of such a front loading type.

The conventional disc player of the front loading type will be described in detail with reference to FIGS. 1 and 2.

FIG. 1 is an exploded perspective view for showing a conventional disc player of the front loading type. As shown in the figure, a disc tray 10 has a hexahedron shape where a front portion, a rear portion and a base are opened. Lower ends of side walls 12 thereof are inwardly bent to form cartridge support pieces 14 for supporting the disc cartridge to be inserted thereinto or ejected therefrom. Tray guide rods 16 are formed on the outer surfaces of side walls 12 of disc tray 10. A moving plate 20 is provided with guide grooves 26 and guide rods 28 which are placed on its side walls. Guide rods 16 which are provided on the left and right sidewalls of disc tray 10 can slide along guide groove 38 while being inserted thereinto so that disc tray 10 can be moved into and from the housing. When loading and unloading the disc cartridge carried by disc tray 10 and moving plate 20 on the turntable, guide rods 16 can be slidably moved within and along guide groove 38 formed on the side walls of loading unit B supporting disc tray 10 and moving plate 20. Meanwhile, loading unit B is disposed above a chassis unit A. On the chassis unit A are provided a spindle assembly 23 for rotating the disc mounted thereon and a pickup apparatus for reading and writing information from the disc which is rotated by the spindle assembly with the movement in the radial direction of the minidisc under the minidisc. As shown in FIG. 2, the chassis unit A is disposed over a bottom of the disc player and below the loading unit B. A loading drive system C has a loading motor for driving the loading unit B, a transmittance gear and a moving plate carrying gear between one side of the loading unit A and a housing of the disc player. A power supply unit D for transmitting a driving force to pickup apparatus 24 is disposed at the side opposite to a side where the loading drive system C is disposed. Using the power supply unit D and the loading drive system C, disc tray 10 and moving plate 20 are guided along guide grooves 38 formed in loading unit B in the front loading method to load and unload the disc on the turntable.

However, in the conventional disc player having the above structure, when loading and unloading the disc cartridge on the turntable, the carrying of tray is performed by means of the loading mechanism (provided with the loading motor, the transmittance gear and the moving plate carrying gear) and the moving plate, so that an internal structure of the disc player becomes extremely complicated, and an assembling work performed at a production line can not help but be increased so as to lower productivity. Further, due to heavy and large-sized products, this conventional structure is an obstacle in view of the recent trends that the disc player has become smaller and more compact in size.

SUMMARY OF THE INVENTION

The present invention is intended to overcome the above-mentioned and numerous other disadvantages and deficiencies of the prior art. Therefore, it is an object of the present invention to provide a disc player provided with loading and ejecting devices of a disc cartridge by means of a simple machinery mechanism, so that an internal structure thereof becomes simple, small and compact in size.

To achieve the above-described object of the present invention, the disc player with loading and ejecting devices comprises:

a housing;

a base plate provided on a bottom of the housing;

a deck provided with a spindle assembly disposed above the base plate;

a disc tray disposed above the deck, into which a disc cartridge is inserted, for carrying the disc cartridge;

disc cartridge loading members each having an operating piece wherein its first upper position is connected to a side of the disc tray and its first lower position is connected to a side of the deck, a first elastic member having an elastic force wherein a first end thereof is connected to a second upper position of the operating piece and a second end thereof is connected to the deck to generate a first elastic force in an opposite direction of an insertion of the disc cartridge, and a second elastic member wherein a first end thereof is connected to a second lower position of the operating piece and a second end thereof is connected to the deck to generate a second elastic force in a lower direction, and an ejecting member for ejecting the disc cartridge in the disc tray.

To achieve the above-described object of the present invention, the disc player with loading and ejecting devices is as follows:

the first upper position of the operating piece is hinged to the side of the disc tray, the first lower position of the operating piece has a guide projection, a position of the deck corresponding to the first lower position of the operating piece is provided with a vertical elongated groove into which the guide projection is slidably inserted, and the loading member has a first spring connected to the upper front edge of the operating piece and the deck to move the tray elastically in a forward direction, and a second spring connected to the base of the operating piece and the deck to move the operating piece elastically in the lower direction.

The present disc player further comprises an auxiliary cartridge loading member having an auxiliary operating piece wherein a top of the auxiliary operating piece is hinged on a side of the disc tray and an auxiliary guide projection is formed on a lower position of the auxiliary operating piece, the deck has an auxiliary vertical elongated groove at a position corresponding to the auxiliary guide projection so that the auxiliary guide projection is slidably moved within the auxiliary guide groove.

The ejecting member of the disc player comprises: a front portion having a width corresponding to that of the deck and disposed below the deck, a pressing button formed at a center of the front portion in the front direction, ejecting rods extended inwardly on two sides of inner walls of the front position, a guide bracket for guiding the ejecting rods inwardly and ejecting springs disposed in front of the guide bracket, and respectively inserting the ejecting rods thereinto, and elastically rebounding from the guide brackets when the ejecting rods are pushed inwardly.

The disc player further comprises an ejecting plate which includes:

a plate having a plurality of guide grooves each being formed in a tray carrying direction;

a plate rear wall formed by being downward bent from a rear edge of the plate;

guide pieces projected downward at a side edge of the plate; and a spring of which one end is connected to a front edge of the plate, wherein the plate is provided on the tray, the downward bent plate rear wall of the plate is hooked to the rear edge of the tray, the guide pieces formed at the side edge of the plate integrally therewith are provided on the side wall of the tray; other end of the spring being connected at the front edge of the plate is fixed to a spaced position on the tray from a connection position of the spring of the front edge along the tray carrying direction; projections are provided on the tray respectively corresponding to the grooves formed on the plate so that the projections are slidably connected in the grooves to slide the plate along the tray carrying direction.

According to this disc player, when the disc cartridge is inserted thereinto, the tray is pushed in an insertion direction thereof to strain the second spring in the insertion direction and erect the operating piece, so that the tray is moved downward by restoring force of the strained first spring thereby to complete a loading operation of the disc cartridge.

When the pressing button is pushed to be protruded forward with downward movement of the first spring at the loading operation, the eject rods are moved inward to push up the operating piece and at that time, the tray is moved forward by restoring force of the second spring thereby to complete an unloading operation of the disc cartridge.

BRIEF DESCRIPTION OF THE DRAWINGS

The present invention may be better understood and its numerous objects and advantages will be more apparent to those skilled in the art by reference to the accompanying drawings in which.

DETAILED DESCRIPTION OF THE PREFERRED EMBODIMENTS

The preferred embodiments of this invention will be described in detail with reference to the accompanying drawings.

EMBODIMENT 1

Figure 1:
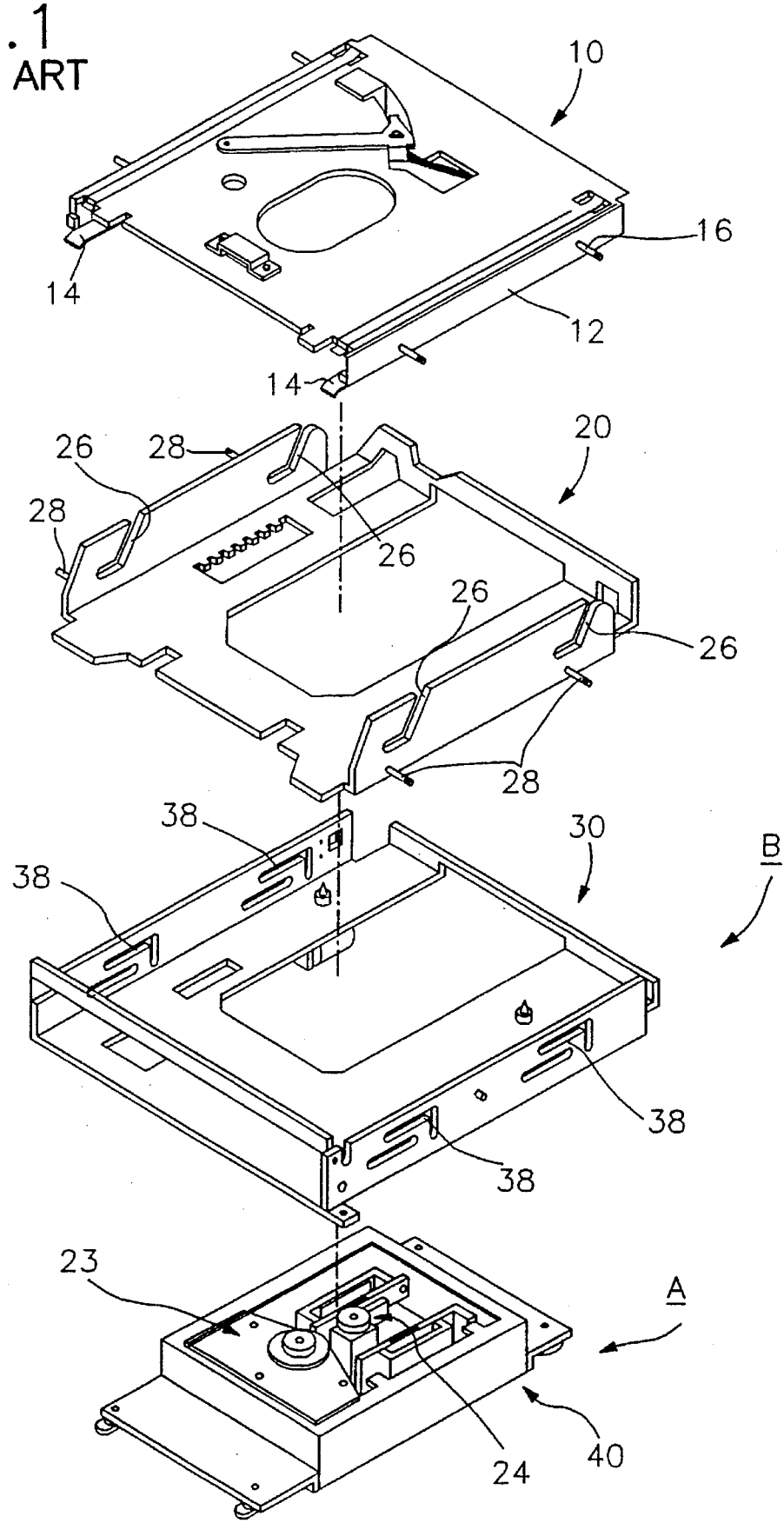
FIG. 1 is an exploded perspective view for showing a conventional disc player of a front loading type.
Figure 2:
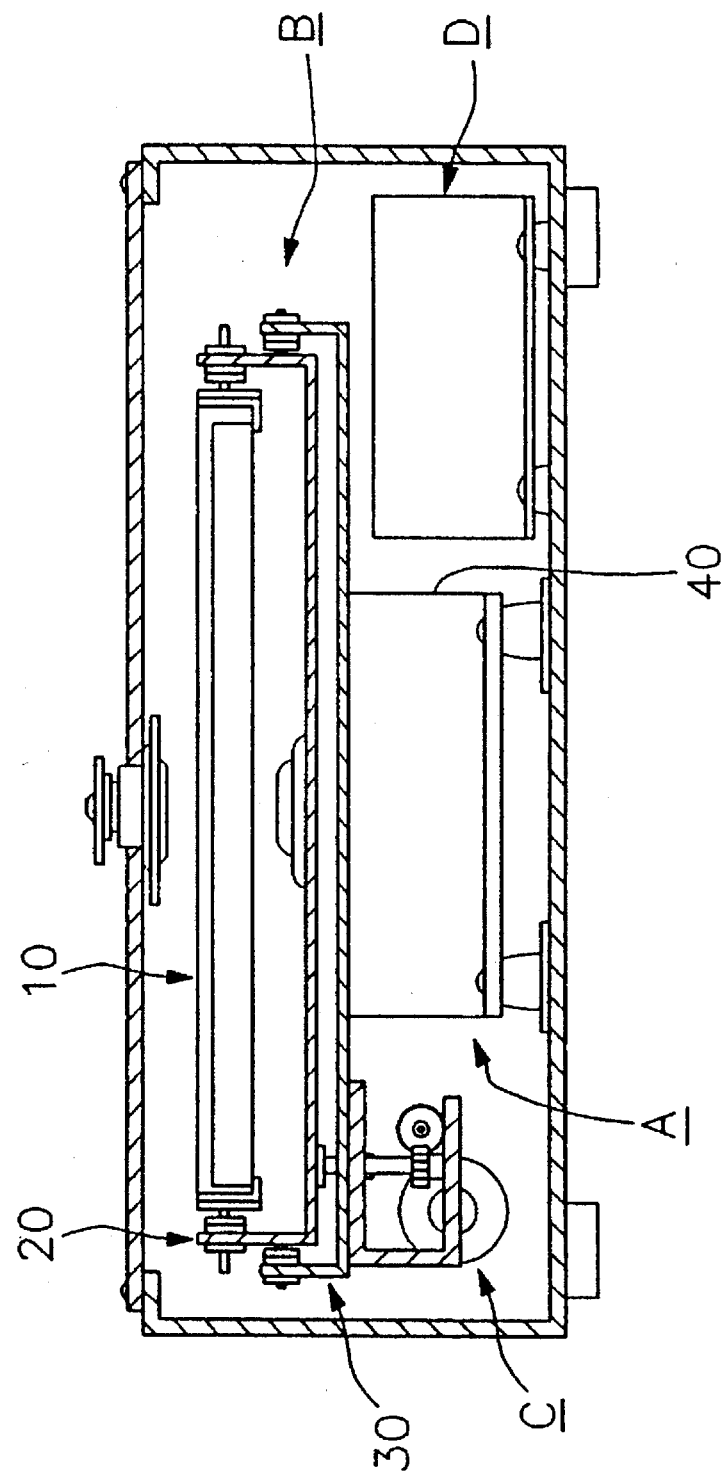
FIG. 2 is a front sectional view for showing a disc player of FIG. 1.
Figure 3:
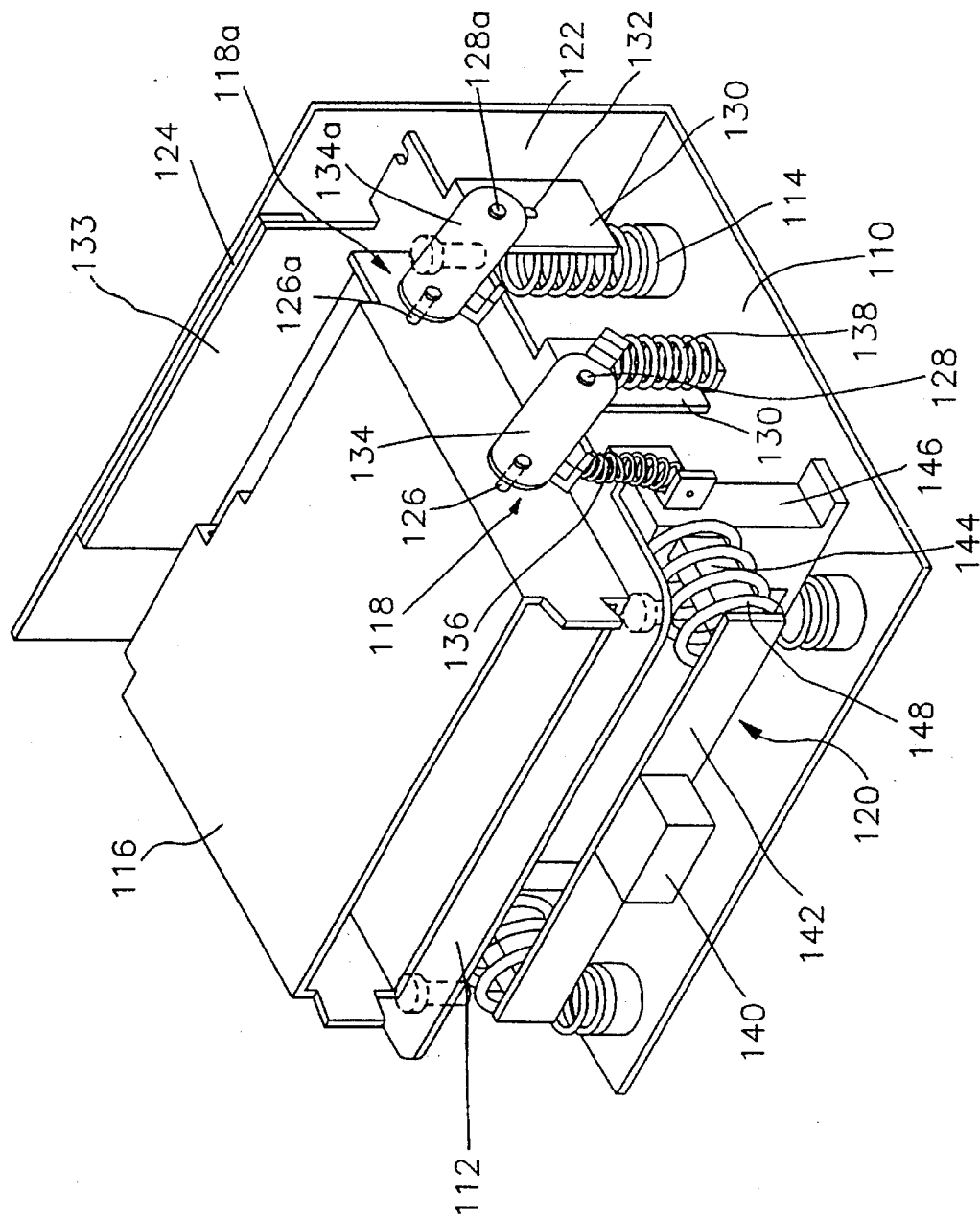
FIG. 3 is a perspective view for showing a disc player of a front loading type according to a first embodiment of the present invention.
Figure 4:
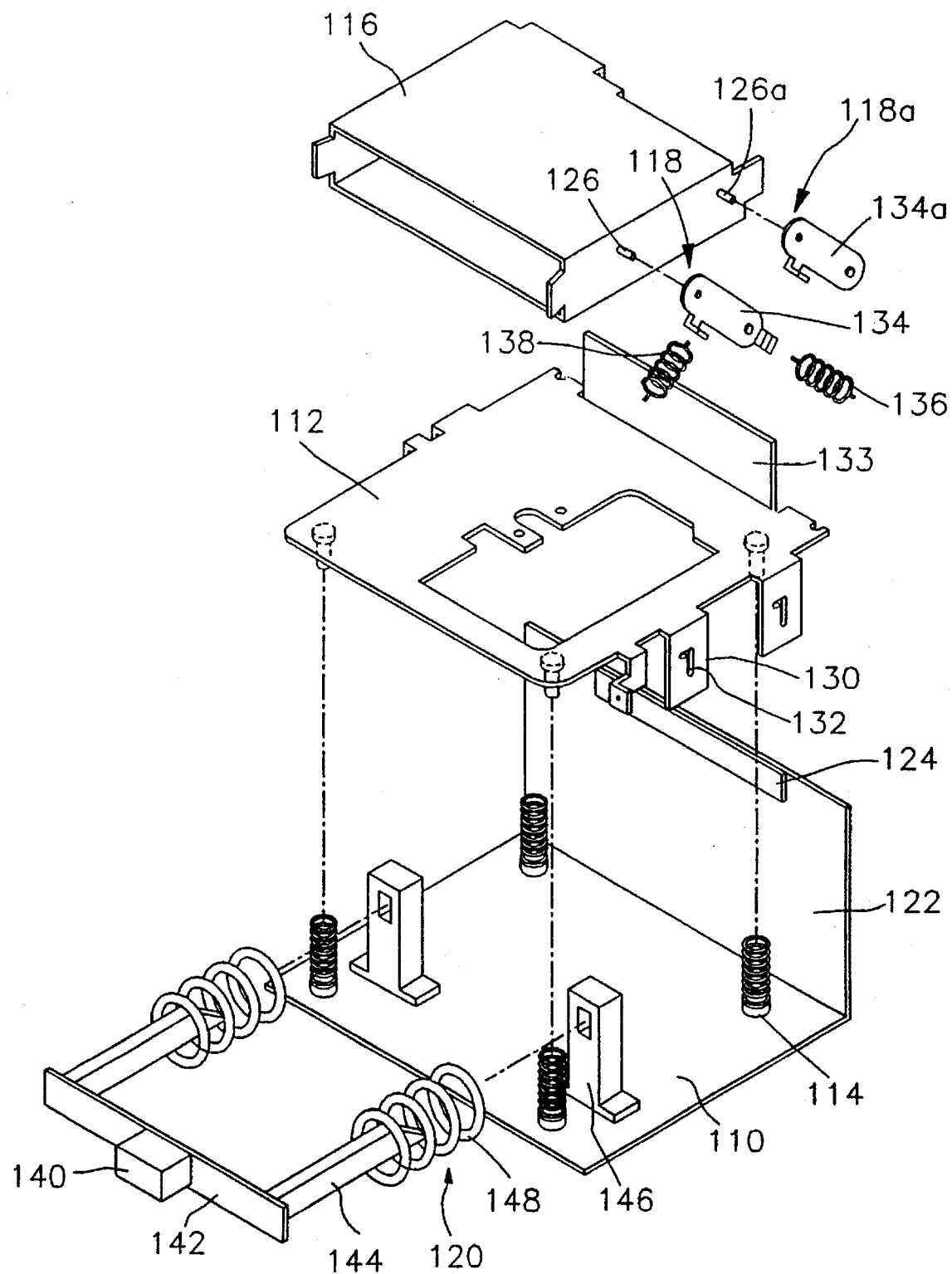
FIG. 4 is an exploded perspective view for showing a disc player of FIG. 3.
Figure 5:
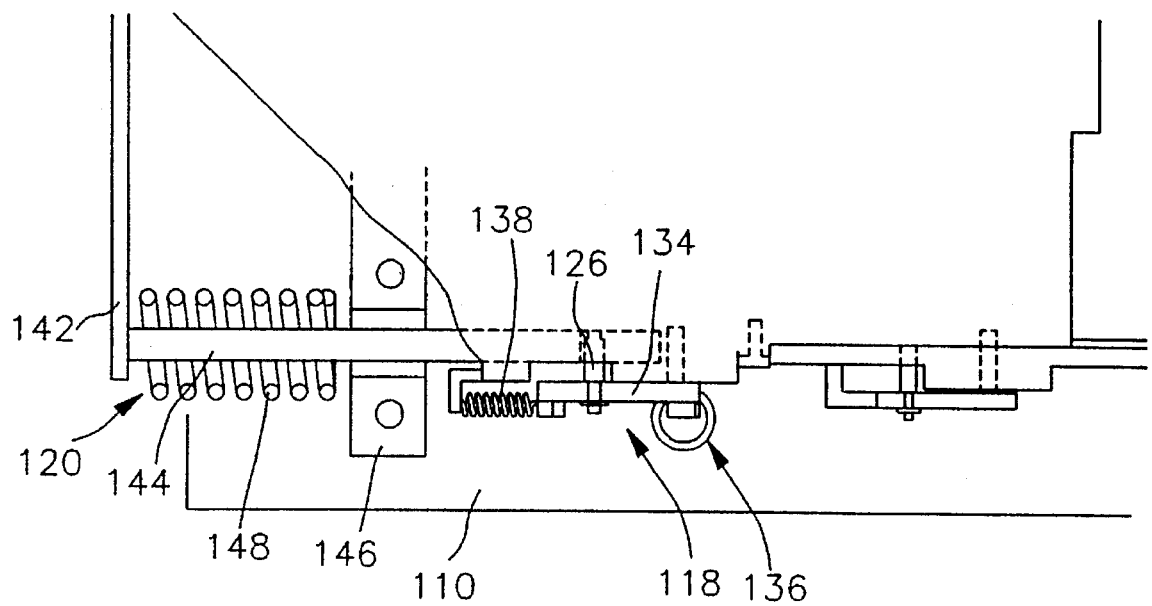
FIG. 5 is a partial sectional plan view of FIG. 3.

FIG. 3 is a perspective view for showing a disc player of a front loading type according to a first embodiment of the present invention. FIG. 4 is an exploded perspective view for showing the disc player of FIG. 3.

As shown, a base plate 110 is disposed on the bottom of housing 100 (see FIG. 6) of the disc player. A rear end edge of base plate 110 is bent upward to form a first stop stopper 122. A buffering pad 124 used for absorbing impacts is formed on an inner side of a top end of stopper 122. A deck 112 to which spindle assembly (not shown) provided with a turntable, a spindle motor and a spindle axis are secured is disposed over base plate 110. Projections 137 in which springs, etc., can be hooked are disposed on four edges of deck 112. The rear portion of deck 112 is bent upwardly to form a second stopper 133. Two or more guide pieces 130 are extended downwardly in a vertical direction on a predetermined position of each of the side edges of deck 112. An elongated guide groove 132 is formed vertically on each of guide pieces 130. The top portion of guide groove 132 is preferably bent forward and parallel with the inserting direction of tray. Damping members 114 are inserted into and secured to portions of base plate 110 corresponding to each of the projections 137 formed on a lower portion of deck 112, so that deck 112 can be mounted on base plate 110 at a floating state. A tray 116 for carrying a disc cartridge mounted therein is provided above deck 112. Deck 112 and tray 116 are connected to each other by using cartridge loading members 118 formed on their sides, so that tray 116 may be mounted on deck 112 at the floating state. The front portion of tray 116 into which disc cartridge 150 is to be inserted is provided passably through disc cartridge insertion opening 196 of housing 100. Tray support 186 is integrally extended inward and horizontally from lower edge of disc cartridge insertion opening 196. Each cartridge loading member 118 has an operating piece 134 having a panel shape and first and second springs 136 and 138 of which respective ends are connected to upper and lower portions of operating piece 134. The upper portion of operating piece 134 is hinged on a corresponding position of the side of tray 116 and the lower portion of operating piece 134 is provided with a guide projection 128 which is to be slidably inserted into elongated guide groove 132 formed in guide piece 130 formed on the side of deck 112. One end of first spring 136 is connected to a lower end of operating piece 134 and the other end thereof is connected to a lower end of the guide piece 130 formed on the side of deck 112, so that tray 116 can be elastically moved in downward direction along the elongated guide groove 132. One end of first spring 136 is secured to a front edge of the upper portion of operating piece 134 and the other end thereof is secured in front position of guide piece 130 in the side of deck 112, so that tray 116 can elastically be moved in a front direction. Here, the elasticity of second spring 138 is preferably greater than that of first spring 136.

Meanwhile, as described above, deck 112 and tray 116 are mutually connected thereto by using cartridge loading member 118 formed on their sides. In addition, in order to maintain a little more the horizontal state and the balance of deck 112 and tray 116, auxiliary loading members 118a each provided with an operating piece 134a of panel shape can preferably be disposed on their sides. Here, the upper positions of operating pieces 134a are respectively hinged on sides corresponding to tray 116 by means of hinge axes 126a formed on sides of tray 116. Guide projections 128a are formed inwardly on a lower portion of operating piece 134a. Therefore, each guide projection 128a is slidably inserted into elongated guide groove 132 formed at a portion of guide piece 130 corresponding to the side of deck 112.

An ejecting device 120 is disposed below deck 112. A front 142 thereof being a panel shape having a width corresponding to that of deck 112 is formed on a position corresponding to the front of deck 112. A pressing button 140 is integrally formed on a center portion of the front thereof in a front direction from housing 100 (see FIG. 6). Eject rod 144 is extended toward the inside of the housing and to the lower portion of guide groove 132 of guide piece 130. To guide eject rods 144 into the inside of the housing 100, guide brackets 146 having a through hole into which eject rod 144 can be slidably moved are disposed on base plate 110. Ejecting rods 144 with which ejecting springs 148 are engaged are penetrated by the through holes of guide brackets 146 to be extended to lower ends of guide grooves 132 of guide piece 130. Thus, when pushing ejecting rod 144 into the inside of housing 100, ejecting spring 148 can elastically rebound against guide bracket 146. A front end of an extension of ejecting rod 144 is inclined downward at a predetermined angle so as to push up operating piece 134 of loading member 118.

Hereinafter, an operation of the disc player according the present embodiment will be described.

Figure 6:
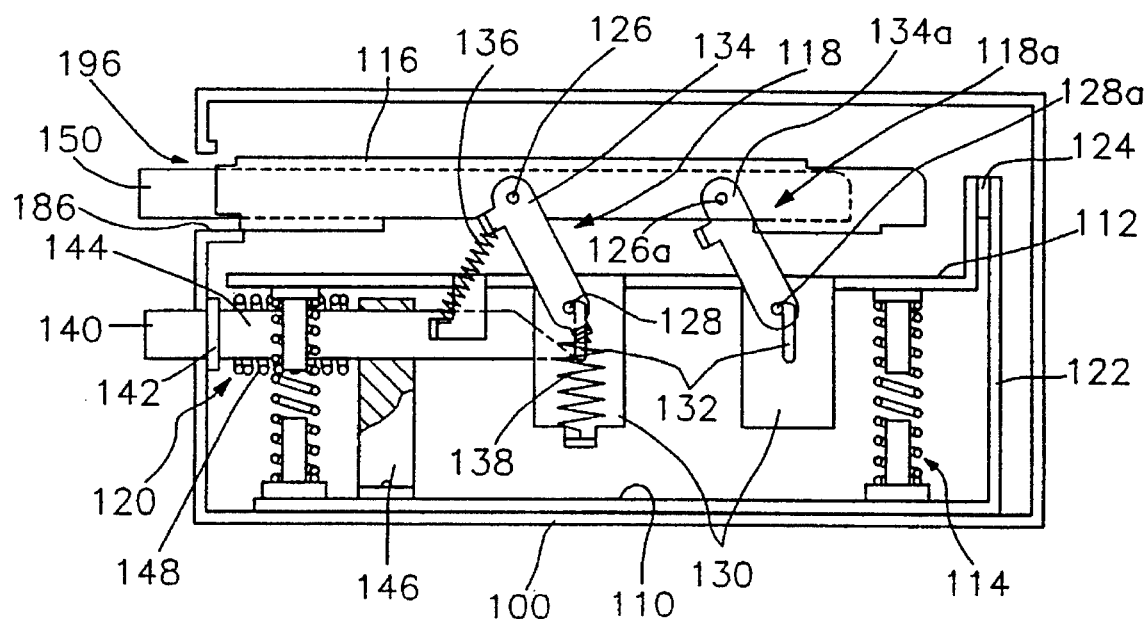
FIG. 6 is a side view for showing an inside of a disc player at an initial state before inserting a disc cartridge thereinto.
Figure 7:
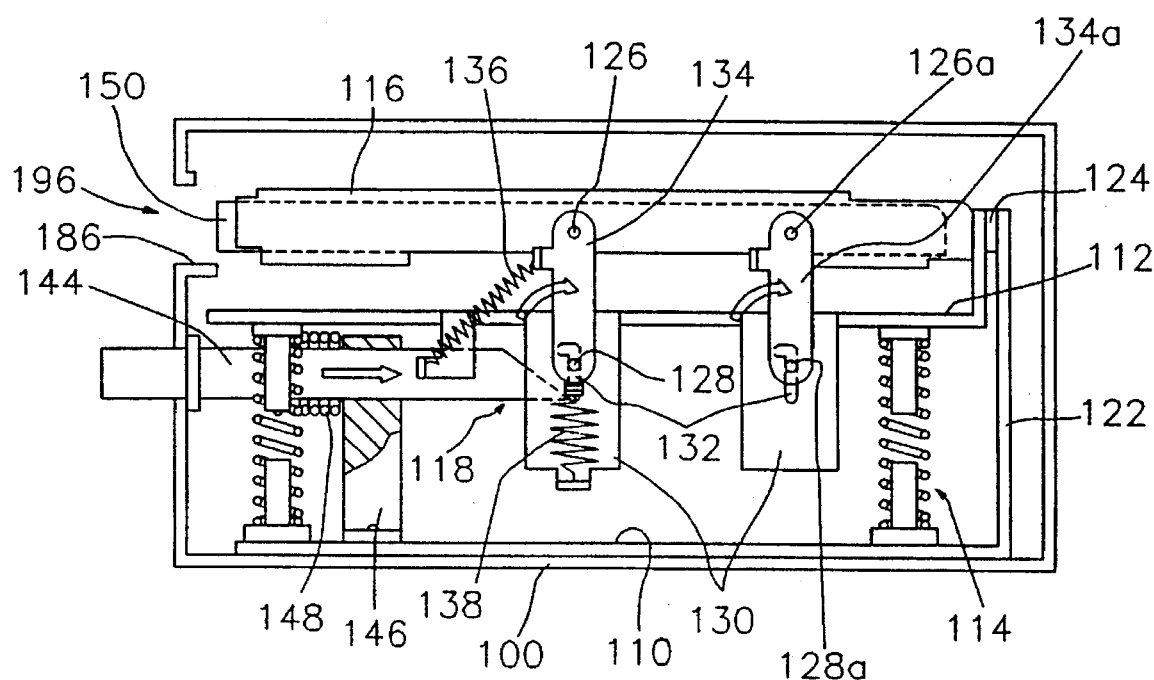
FIG. 7 is a side view for showing a standing erect state of an operating piece during loading a disc cartridge.
Figure 8:
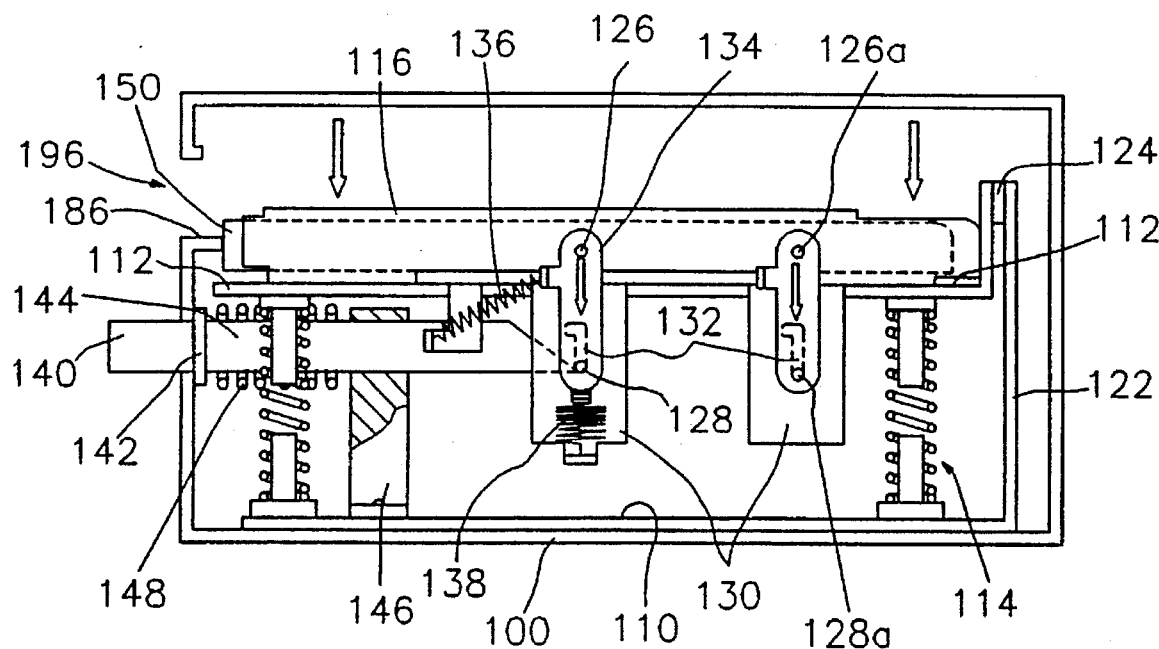
FIG. 8 is a side view for showing a completed state of a loading operation of a disc cartridge.

FIG. 6 is a side view for showing an inside of the disc player at an initial state before inserting the disc cartridge thereinto. FIG. 7 is a side view for showing a standing state of the operating piece during loading of the disc cartridge. FIG. 8 is a side view for showing a completed state of a loading operation of the disc cartridge. As shown in FIG. 6, before the insertion of the disc cartridge thereinto, tray 116 is fixedly mounted on tray support 186 of disc cartridge insertion opening 196 of housing 100. Since disc cartridge loading member 118 having operation piece 134, first spring 138 connected to a front edge of the upper portion of operating piece and second spring 138 connected to a lower end thereof is hinged on tray 116, first and second springs 136 and 138 connected to deck 112 are strained. In the state before inserting of a disc, since first spring 136 is strained upward within guide groove 132 of deck 112 so that it is maintained in the strained state due to tray support 186 and the bent top portion of guide groove 132, and at the same time second spring 138 of which an elastic force is greater than that of first spring 136 is strained forward, operating piece 134 tends to be rotated forward centering on guide projection 128 formed on the lower end of operating piece 134, and thus guide projection 128 of the lower end of operating piece 134 is in a state being rotated by a predetermined angle forward centering on projection 128 from the upper end of guide piece 130.

At that initial state, when a user inserts the disc cartridge thereinto, the front end of cartridge 150 becomes in contact with the rear end of tray 116 to push tray 116, so that second spring 138 is strained in the insertion direction, i.e. rearward of housing 100. Therefore, as shown in FIG. 7, operating piece 134 stands erect, and guide projection 128 slides rearward along the bent top portion of guide groove 132.

Sequentially, as shown in FIG. 8, as the restoring force of the strained first spring 136 pulls first spring 136 downwardly, guide projection 128 formed on the inner wall of the lower end of operating piece 134 is pulled in the downward direction of guide groove 132 formed at guide piece 130 formed on the deck side, so that tray 116 into which the disc is inserted is mounted on the top of deck from an initial floating state thereby to complete the loading operation.

Here, operating piece 134a of auxiliary loading member 118a is moved together with operating piece 134 to maintain the horizontal state and the balance of tray 112 and deck 116, and also to absorb impacts caused by elasticity of first and second springs 136 and 138.

To eject disc cartridge 150 from the loaded state, when a user facing the front of housing 100 pushes a pressing button 140 which is projected forward of housing 100, ejecting rods 144 disposed on the inner wall of the front portion thereof are moved inwardly, so that guide projection 128 of loading member 118 disposed on the lower end of guide groove 130 of deck 112 is moved to the top of guide groove 132 along the inclined surface of the front end of ejecting rod 134, and thereafter guide projection 128 is slid forward of housing 100 along the bent top portion of guide groove 132 by the restoring force of second spring 138 as shown in FIG. 7. Sequentially, the restoring force of second spring 138 having greater elastic force than that of first spring 136 is applied thereto, so that operating piece 134 is rotated forward centering around guide projection 128 and at the same time tray 116 is moved forward to eject disc cartridge 150.

According to the present embodiment, the loading and ejecting operations are performed by a simple construction having the first and second springs, the operating piece and a machinery mechanism, so that an internal construction becomes extremely simple to achieve miniaturization of the disc player.

EMBODIMENT 2

Figure 9:
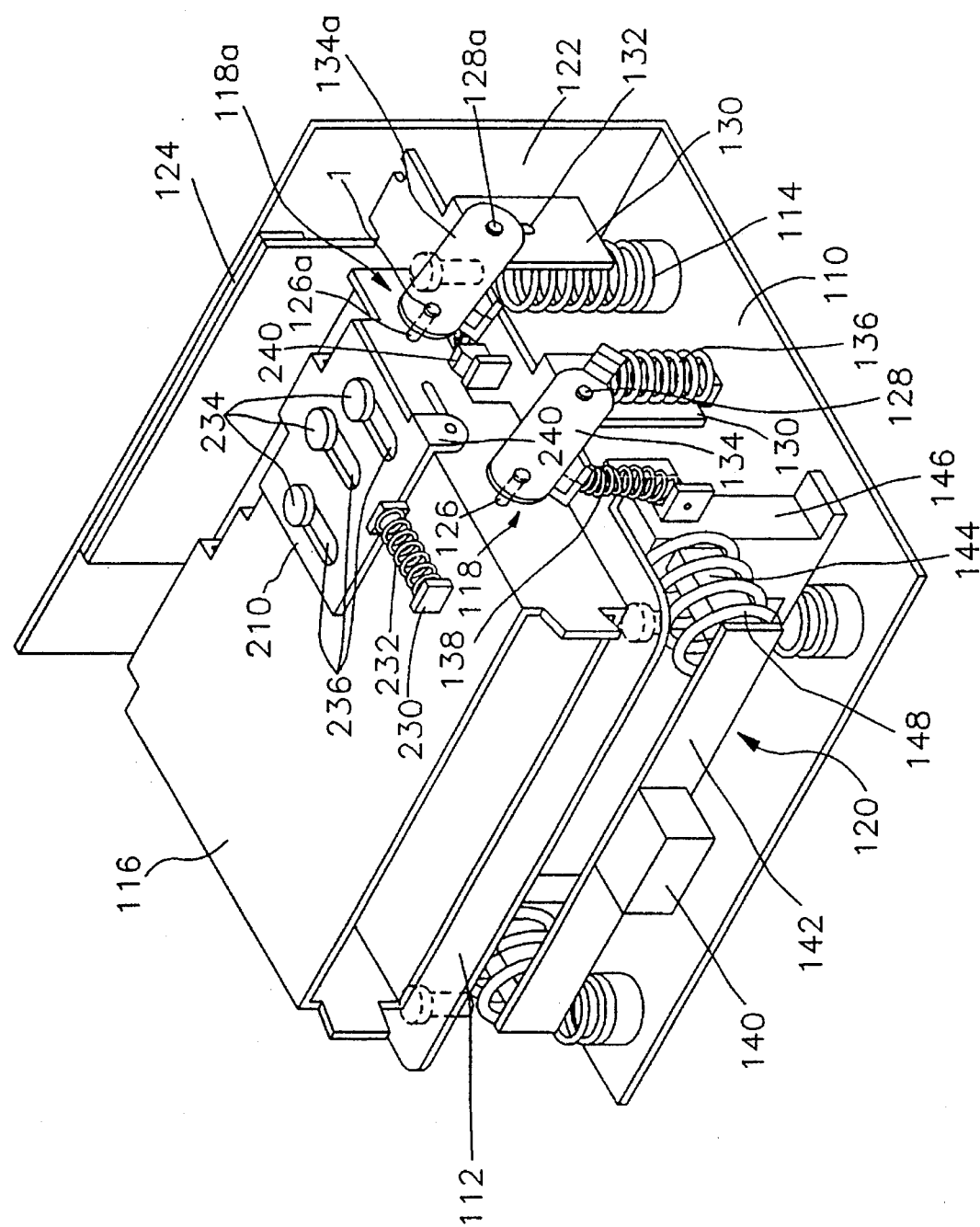
FIG. 9 is a perspective view for showing a disc player of a front loading type according to a second embodiment of the present invention.
Figure 10:
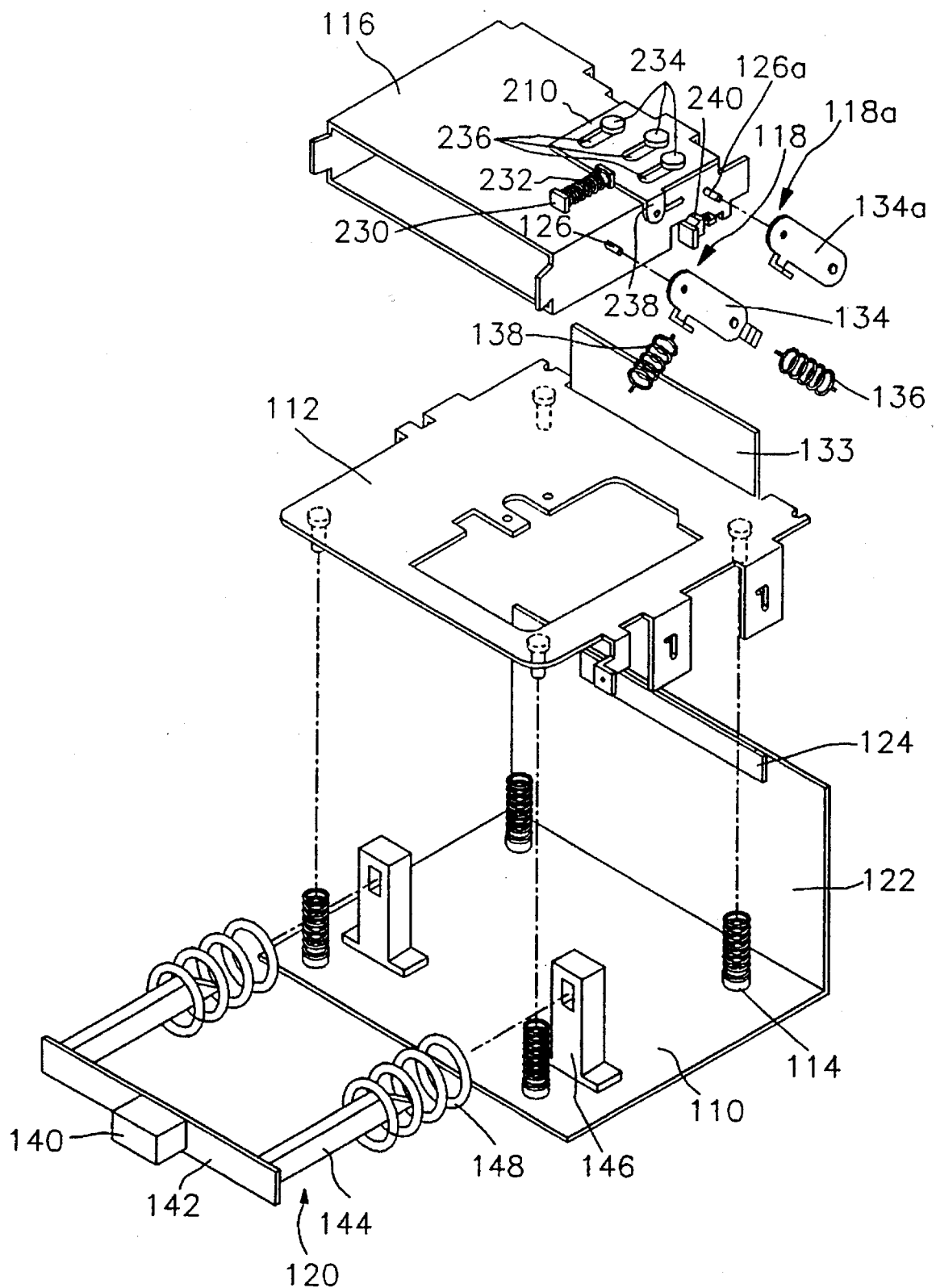
FIG. 10 is an exploded perspective view for showing a disc player of FIG. 9.

FIG. 9 is a perspective view for showing a disc player of the front loading type according to a second embodiment of the present invention. FIG. 10 is an exploded perspective view for showing the disc player of FIG. 9. In these figures, reference numerals as indicated in the first embodiment are used for indication of the same members as in Embodiment 1.

Figure 11:
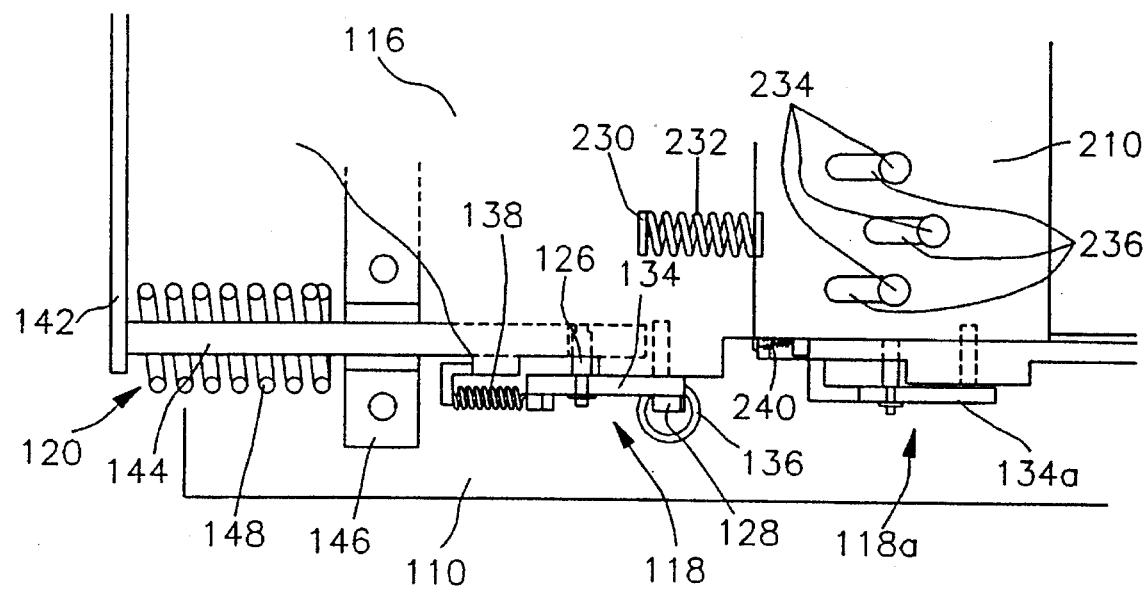
FIG. 11 is a partial sectional plan view of FIG. 9.

As described above in the first embodiment and shown in FIGS. 9 through 11, base plate 110 is disposed on a top of housing 100 (see FIG. 12) of the disc player. Deck 112 to which spindle assembly (not shown) provided with a turntable, a spindle motor and a spindle axis is secured is disposed on base plate 110. Respective two guide pieces 130 or more than that are extended downward in a vertical direction on predetermined positions of side edges of deck 112. An elongated guide groove 132 is formed vertically on each of guide pieces 130. The top portion of guide groove 132 is preferably bent forward and parallel with the inserting direction of tray. Above deck 112 is provided tray 116 for carrying a disc cartridge mounted thereon. Deck 112 and tray 116 are mutually connected thereto by respective cartridge loading members 118 formed on their sides, so that tray 116 can be mounted above deck 112 at the floating state. The front portion of tray 116 into which disc cartridge 150 is to be inserted is provided passably through disc cartridge insertion opening 196 of housing 100. Tray support 186 is integrally extended inward and horizontally from lower edge of disc cartridge insertion opening 196. Cartridge loading member 118 has operating pieces 134 of panel shape and first and second springs 136 and 138 of which respective ends are connected to an upper and lower portions of operating pieces 134. One end of first spring 136 is connected to a lower end of operating piece 134 and other end thereof is connected to a lower end of the guide piece formed on the side of deck 112, so that tray 116 can be elastically moved in a downward direction. One end of second spring 138 is secured to a front edge of the upper portion of operating piece 134 and the other end thereof is secured to deck 112 in front position of guide piece 130 in the side of deck 112, so that tray 116 can be elastically moved in a front direction. Here, elastic force of second spring 138 is preferably greater than that of first spring 136.

In addition, to maintain a little more a horizontal state and balance of deck 112 and tray 116, auxiliary loading members 118*a* each provided with auxiliary operating pieces 134*a* of panel shape can be disposed preferably on its side and parallel with loading members 118.

Below deck 112 is provided ejecting device 120 wherein ejecting rods 144 are extended to the lower ends of guide grooves 132 of guide piece 130 of deck 112 inside the housing. To guide ejecting rods 144 to the inside of housing 100, two guide brackets 146 provided with through holes by which ejecting rods 144 can be slidably penetrated are disposed on a top of base plate 110. Ejecting rods 144 with which ejecting springs 148 are engaged are penetrated by the through holes of guide brackets 146 to be extended to the lower ends of guide grooves 132 of guide piece 130. Ejecting plate 210 for elastically ejecting the disc cartridge is disposed on a top of tray 116 of the disc player. Three or more guide grooves 236 are formed in ejecting plate 210 and each elongated in a tray carrying direction. Rear edge of ejecting plate 210 is bent downward to form a rear side wall. Second guide piece 238 is extended downward to a side edge of plate 210. One end of third spring 232 is secured to a center of a front edge of plate 210. On the top of the tray, first projection piece 230 is formed to be spaced along the tray carrying direction from the center of the front edge of plate 210. The other end of third spring 232 is secured to first projection piece 230.

The rear side wall of plate 210 which is bent downward is disposed to be hooked on the rear side wall of tray 116 to be able to pull it to the front of housing 100. Second guide piece 238 is formed to be extended downward from the side edge of plate 210 to be disposed to be hooked on the side wall of tray 116. Projections 234 are formed on the tray corresponding to respective guide grooves 236 of plate 210, so that plate 210 can be slidably moved within guide groove 236 along the tray carrying direction. Movable second projection pieces 240 are disposed on side walls of tray 116 spaced rearward from a position corresponding to guide piece 238 of plate 210 and just nearby a front of auxiliary cartridge loading member 118*a* to be moved upward and downward on the side wall of tray 116. Projection 234*a* is formed on a front edge of an upper portion of operating piece 134*a* of auxiliary loading member 118*a*.

Hereinafter, an operation of the second embodiment will be described.

Figure 12:
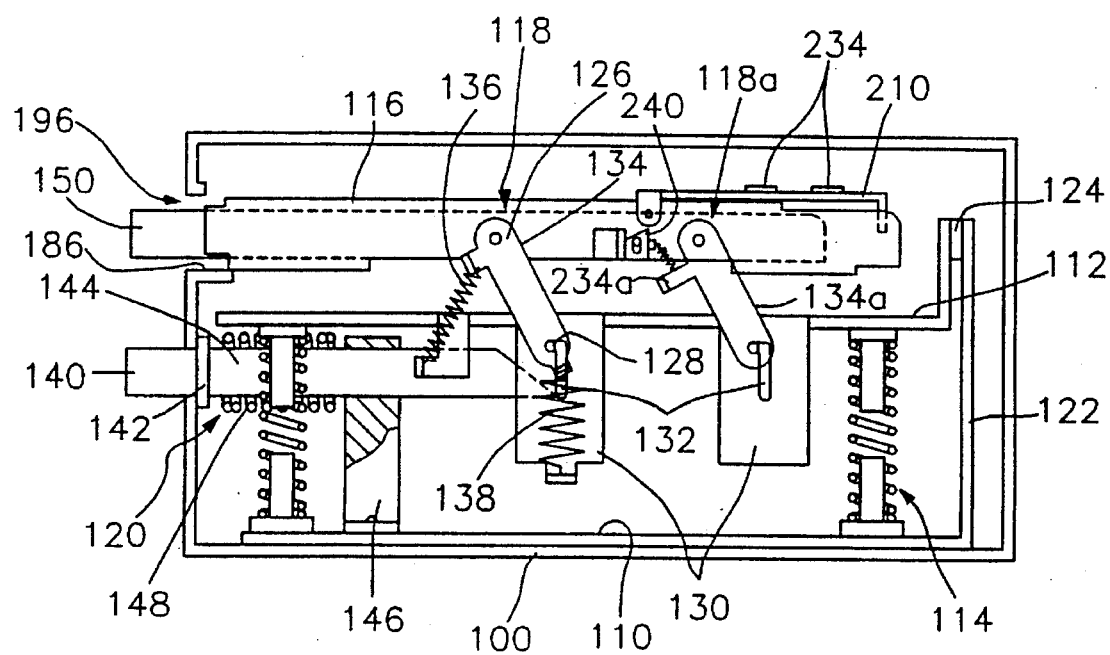
FIG. 12 is a side view for showing an inside of a disc player at an initial state before inserting a disc cartridge thereinto.

FIG. 12 is a side view for showing an inside of the disc player at an initial state before inserting the disc cartridge thereinto. As shown, before insertion of the disc cartridge thereinto, tray 116 is fixedly mounted on tray support 186 of disc cartridge insertion opening 196 of housing 100. Since cartridge loading member 134 having operating piece 134, second spring 138 connected to a front edge of the upper portion of operating piece and first spring 136 connected to a lower end thereof is hinged on tray 116, first and second springs 136 and 138 connected to deck 112 becomes strained. In the state before inserting of a disc, since first spring 136 is strained upward within guide groove 132 of deck 112 so that it is maintained in the strained state due to tray support 186 and the bent top portion of guide groove 132, and at the same time second spring 138 of which an elastic force is greater than that of first spring 136 is strained forward, operating piece 134 tends to be rotated forward centering on guide projection 128 formed on the lower end of operating piece 134, and thus guide projection 128 of the lower end of operating piece 134 is in a state being rotated by a predetermined angle forward centering on projection 128 from the upper end of guide piece 130.

Figure 13:
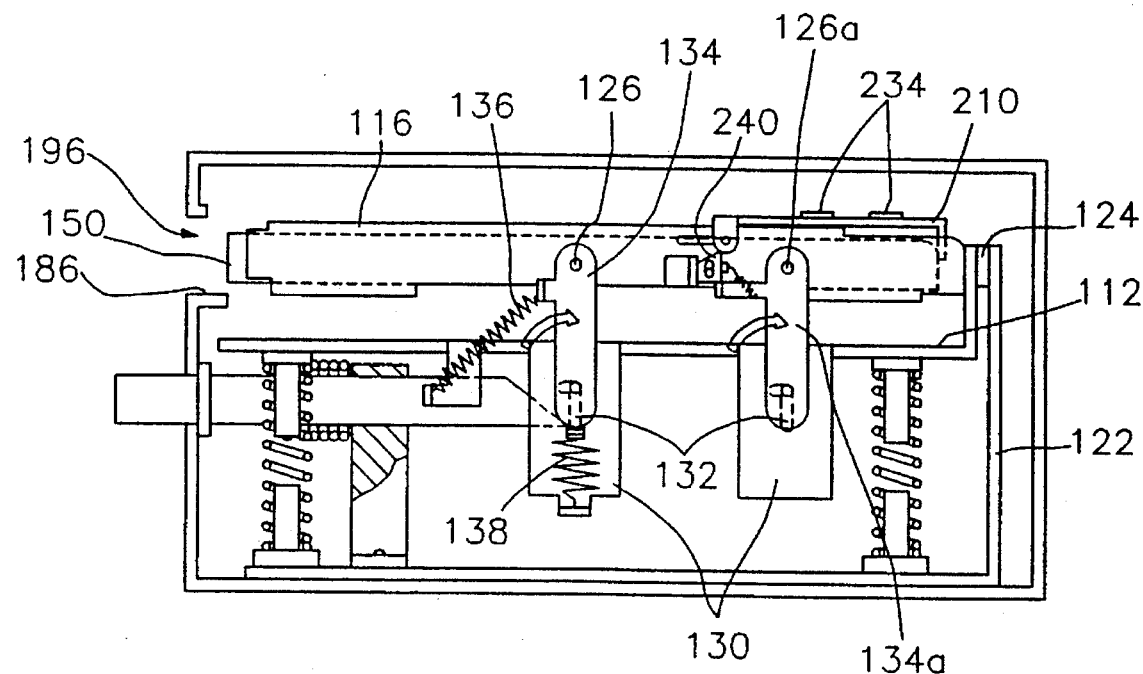
FIG. 13 is a side view for showing a standing erect state of an operating piece during the loading of a disc cartridge.

At that initial state, when a user inserts the disc cartridge thereinto, the front end of cartridge 150 is in contact with the rear end of tray 116 to push tray 116, so that second spring 138 is strained in the insertion direction, i.e., rearward of housing 100. Therefore, as shown in FIG. 7, operating piece 134 stands erect, and guide projection 128 slides rearward along the bent top portion of guide groove 132. FIG. 13 is a side view for an erecting state of the operating piece during loading of the disc cartridge. At that time, ejecting plate 210 disposed on the top of tray 116 is pulled thereinto by the front end of disc cartridge 150 and at the same time, movable projection piece 240 is moved upward along the grooves formed on the side walls of tray 116 by projection 234*a* of operating piece 134*a*, so that ejecting plate 210 is blocked thereby not to be moved backward of ejecting plate 210.

Figure 14:
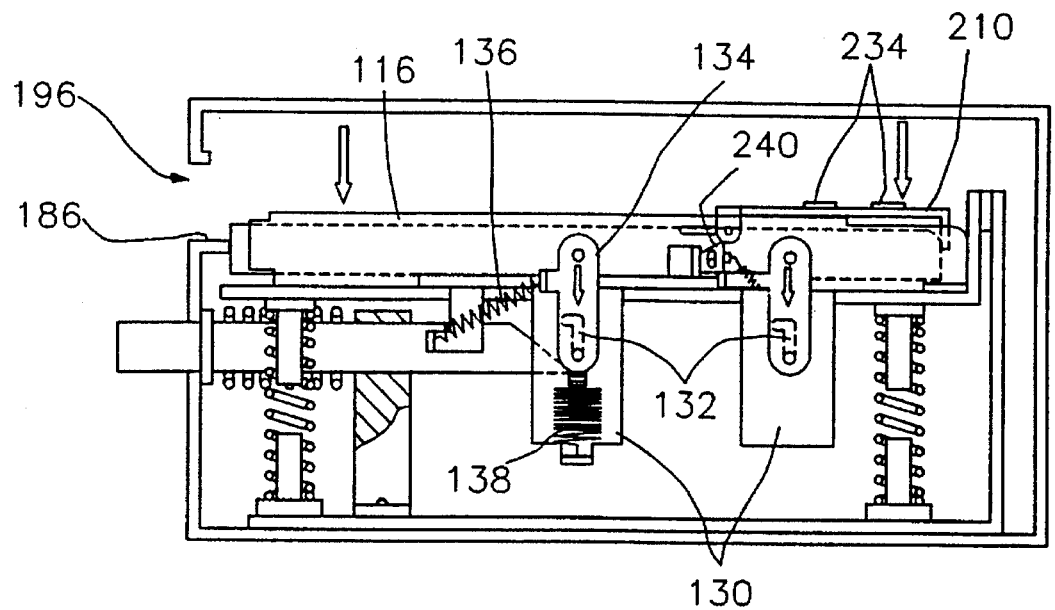
FIG. 14 is a side view for showing a completed state of a loading operation of a disc cartridge.

FIG. 14 is a side view for showing a completed state of a loading operation of the disc cartridge. As shown, as the restoring force of strained first spring 136 pulls first spring 136 downward, guide projection 128 formed on the inner wall of the lower end of operating piece 134 is pulled downward along guide groove 132 formed on guide piece 130 formed on the deck side, so that tray 116 into which the disc is inserted is mounted on the top of deck from an initial floating state thereby to complete the loading operation.

Here, operating piece 134*a* of auxiliary loading member 118*a* is moved together with operating piece 134 to maintain the horizontal state and balance of tray 116 and deck 112 and also, absorb impacts caused by elasticity of first and second springs.

To eject disc cartridge 150 from the loaded state, when a user facing the front of housing 100 pushes a pressing button 140 which is projected forward of housing 100, ejecting rods 144 disposed on the inner wall of the front portion thereof are moved inwardly, so that guide projection 128 of loading member 118 disposed on the lower end of guide groove 130 of deck 112 is moved to the top of guide groove 132 along the inclined surface of the front end of ejecting rod 134, and thereafter guide projection 128 is slid forward of housing 100 along the bent top portion of guide groove 132 by the restoring force of second spring 138 as shown in FIG. 13. Sequentially, the restoring force of second spring 138 having greater elastic force than first spring 136 is applied thereto, so that operating piece 134 is rotated forward centering around guide projection 128 to rotate operating piece 134a of operating piece 118a. Thus, projection 234a to be projected from the upper front edge of operating piece 134a and blocking the reverse movement of ejecting plate 210 is rotated together with operating piece 134a. Thus, second projection piece 240 is moved downward, and at the same time, ejecting plate 210 is elastically moved toward the front of housing 100 by the restoring force of third spring 232, so that tray 116 can be elastically moved forward and come to be able to eject disc cartridge 150.

In the second embodiment of the present invention, loading and ejecting operations are performed by a simple construction having the first and second springs end the operating piece and by a simple machinery mechanism, so that an internal construction has become simpler to achieve miniaturization of the disc player. Also, due to elastic movement of the ejecting plate disposed on the top of the tray, an ejecting operation of the disc cartridge mounted on the tray is elastically performed, so that it is possible to obtain the improved disc player.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A disc player comprising:

a housing;

a base plate provided on a bottom of said housing;

a deck provided with a spindle assembly disposed above said base plate;

a disc tray disposed above said deck, into which a disc cartridge is inserted, for carrying the disc cartridge;

disc cartridge loading members each having an operating piece wherein a first upper portion of said operating piece is connected and hinged to a side of said disc tray and a first lower portion of said operating piece is connected to a side of said deck, and said first lower portion has a guide projection and a portion of said deck corresponding to the first lower portion of said operating piece is provided with a vertical elongated groove into which the guide projection is slidably inserted, and a first elastic member wherein a first end thereof is connected to a second lower portion of said operating piece and a second end thereof is connected to said deck to generate a first elastic force in a downward direction, and a second elastic member having an elastic force wherein a first end thereof is connected to a second upper portion of said operating piece and a second end thereof is connected to said deck to generate a second elastic force in an opposite direction of an insertion of the disc cartridge; and an ejecting member for ejecting said disc cartridge in the disc tray.

2. The disc player as claimed in claim 1, wherein said base plate has a first stopper formed by bending upwardly a rear edge thereof and a buffering pad which is provided on an upper portion of an inner side of said first stopper facing said disc tray for absorbing impact.

3. The disc player as claimed in claim 1, wherein said first elastic member has a greater elastic force than that of said second elastic member.

4. The disc player as claimed in claim 1, wherein said ejecting member includes:

a front portion having a width corresponding to that of said deck and disposed below said deck, a pressing button formed at a center of said front portion in a front direction, ejecting rods extended inwardly on two sides of inner walls of a front portion, a pair of guide brackets for guiding the ejecting rods inwardly and ejecting springs disposed in front of the guide bracket, respectively inserting the ejecting rods thereinto, and elastically rebounding from said guide brackets when the ejecting rods are pushed inwardly.

5. The disc player as claimed in claim 4, wherein an extended edge of each of the ejecting rods is inclined downwardly to push up said deck.

6. The disc player as claimed in claim 1, further comprising a disc cartridge insertion opening which the disc cartridge is to be inserted through, which is positioned on the front side of housing corresponding to said tray, which has a tray support integrally extended inward and horizontally from a lower edge thereof.

7. The disc player as claimed in claim 1, wherein a top portion of said guide groove is preferably bent forward and parallel with an inserting direction of tray.

8. A disc player comprising:

a housing;

a base plate provided on a bottom of said housing;

a deck provided with a spindle assembly disposed above said base plate;

a disc tray disposed above said deck, into which a disc cartridge is inserted, for carrying the disc cartridge;

disc cartridge loading members each having an operating piece wherein a first upper portion of said operating piece is connected and hinged to a side of said disc tray and a first lower portion of said operating piece is connected to a side of said deck, and a first elastic member wherein a first end thereof is connected to a second lower portion of said operating piece and a second end thereof is connected to said deck to generate a first elastic force in a downward direction, and a second elastic member having an elastic force wherein a first end thereof is connected to a second upper portion of said operating piece and a second end thereof is connected to said deck to generate a second elastic force in an opposite direction of an insertion of the disc cartridge;

an ejecting member for ejecting said disc cartridge in the disc tray; and an auxiliary cartridge loading member having an auxiliary operating piece wherein a top of the auxiliary operating piece is hinged on a side of said disc tray and an auxiliary guide projection is formed on a lower portion of the auxiliary operating piece, said deck has an auxiliary vertical elongated groove at a portion corresponding to the auxiliary guide projection so that the auxiliary guide projection is slidably moved within the auxiliary guide groove.

9. A disc player comprising:

a housing;

a base plate provided on a bottom of said housing;

a deck provided with a spindle assembly disposed above said base plate;

a disc tray disposed above said deck, into which a disc cartridge is inserted, for carrying the disc cartridge;

disc cartridge loading members each having an operating piece wherein a first upper portion of said operating piece is connected and hinged to a side of said disc tray and a first lower portion of said operating piece is connected to a side of said deck, and a first elastic member wherein a first end thereof is connected to a second lower portion of said operating piece and a second end thereof is connected to said deck to generate a first elastic force in a downward direction, and a second elastic member having an elastic force wherein a first end thereof is connected to a second upper portion of said operating piece and a second end thereof is connected to said deck to generate a second elastic force in an opposite direction of an insertion of the disc cartridge;

an ejecting member for ejecting said disc cartridge in the disc tray; and an ejecting plate which includes:
- a plate having a plurality of guide grooves each being formed in a tray carrying direction;
- a plate rear wall formed by being downwardly bent from a rear edge of said plate;
- guide pieces projected downward at a side edge of said plate; and
- a spring of which one end is connected to a front edge of said plate, wherein said plate is provided on the tray, the downward bent plate rear wall of said plate is hooked to the rear edge of the tray, said guide pieces formed at said side edge of said plate integrally therewith are provided on the side wall of the tray; other end of said spring being connected at said front edge of said plate is fixed to a spaced position on the tray from a connecting position of said spring of said front edge along the tray carrying direction; projections are provided on the tray respectively corresponding to said grooves formed on the plate so that the projections are slidably connected in the grooves to slide the plate along the tray carrying direction.

10. The disc player as claimed in claim 9, further comprising an auxiliary cartridge loading member having one operating piece wherein a top of said operating piece is hinged on a side wall of said tray; and guide projections are formed either on a corresponding position to side wall of said deck or on lower position of said operating piece, and also guide grooves being vertically extended are formed on the other position, so that said projections are slidably connected within said guide grooves.

11. The disc player as claimed in claim 9, wherein movable second projection pieces each are disposed at a rearward spaced position on the side wall of said tray from a position corresponding to said guide piece of said plate and just nearby an upper front edge of said auxiliary cartridge loading member to be moved upward and downward on said side wall of said tray and a projection is formed at the upper front edge of the operating piece of said auxiliary loading member.

\* \* \* \* \*